US005787561A

United States Patent [19]

Harmand

[11] Patent Number: 5,787,561

[45] Date of Patent: Aug. 4, 1998

[54] PULLING TOOL FOR EXTRACTING RING INSERTS

[75] Inventor: Brice Harmand, San Diego, Calif.

[73] Assignee: Harmand Family Limited Partnership A California Limited Partnership, San Diego, Calif.

[21] Appl. No.: 475,638

[22] Filed: Jun. 7, 1995

Related U.S. Application Data

[60] Division of Ser. No. 217,694, Mar. 25, 1994, abandoned, which is a continuation-in-part of Ser. No. 138,465, Oct. 15, 1993, Pat. No. 5,406,685.

[51] Int. Cl.$^6$ .......... B23P 19/04

[52] U.S. Cl. .......... 29/255; 29/235

[58] Field of Search .......... 29/262, 261, 265, 29/252, 254, 280, 283

[56] References Cited

U.S. PATENT DOCUMENTS

| | | | |
|---|---|---|---|
| 2,719,747 | 10/1955 | Layne . | |
| 2,814,098 | 11/1957 | Kessell . | |
| 3,008,227 | 11/1961 | Fielders . | |
| 3,055,093 | 9/1962 | Ruble . | |
| 3,252,210 | 5/1966 | Bowden . | |
| 3,336,652 | 8/1967 | Ullmo | 29/262 |
| 3,339,263 | 9/1967 | Dodge | 29/252 |
| 4,050,136 | 9/1977 | Shultz . | |
| 4,586,230 | 5/1986 | Harydzak et al. | 29/254 |
| 4,724,608 | 2/1988 | Parrott . | |
| 4,765,049 | 8/1988 | Lundquist . | |
| 4,944,081 | 7/1990 | Ross . | |
| 5,090,102 | 2/1992 | Lovell . | |

FOREIGN PATENT DOCUMENTS

| | | | |
|---|---|---|---|
| 6078 | 4/1978 | United Kingdom | 29/262 |

OTHER PUBLICATIONS

Snap-On 1991-1992 Caralog, pp. 252-256.
Professional Tool & Equipment News, Nov. 1993, p. 66.
Applicant Sales Brochure, Published Oct. 22, 1993.

*Primary Examiner*—Robert C. Watson
*Attorney, Agent, or Firm*—Brown, Martin, Haller & McClain, LLP

[57] ABSTRACT

The pulling tool has a pulling head for gripping an insert, such as an engine valve seat or a pre-combustion chamber, and for pulling it out of a recess. A gripping mechanism for an annular insert, such as a valve seat, may grip the insert by its inner edges. Such a gripping mechanism includes a shaft that slides freely through a bore in the body in a direction parallel to the body. At the end of the shaft is a cone, which cooperates with at least two toothed claws. The toothed claws may be pivotally mounted on a lower extension of the body or may be integrally formed with one another as a collet and flex radially outwardly. The body may have a lever that, when depressed, lifts the shaft, pulling up on the cone, causing the claws to move outward, and causing teeth to penetrate the metal of the insert on its inner diameter to lock into the insert. A gripping mechanism for an insert having a central or eccentric opening, such as a pre-combustion chamber, may have a pivoting claw arm with a tooth on one end. The end of the arm with the tooth is inserted into the opening of the insert at an oblique angle. A set screw forces the claw arm to pivot, which causes the tooth to penetrate the metal of the insert from behind. A pneumatic puller may be used with either gripping mechanism to remove the gripped insert from the recess.

20 Claims, 8 Drawing Sheets

2
4
6
6'
8
12
13
14
16
16'
17
40
42
44
46
48
50
54
58
58'

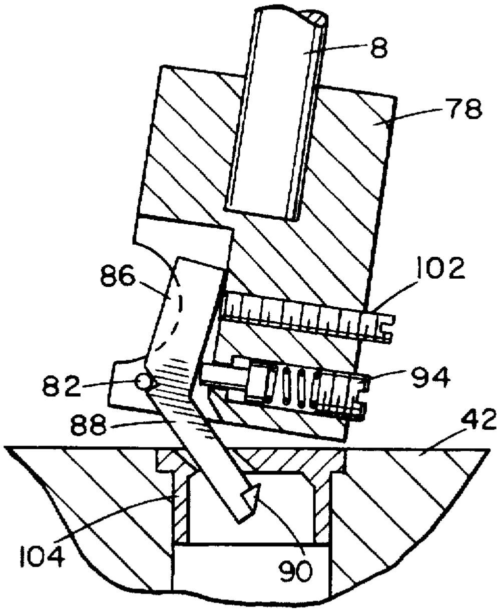
FIG. 12a
FIG. 12b
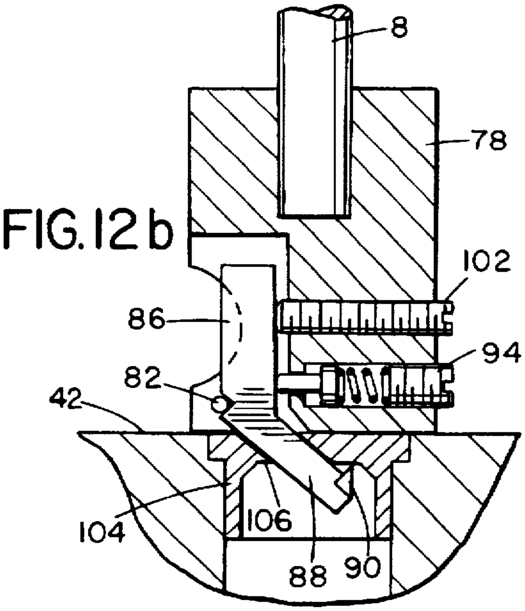
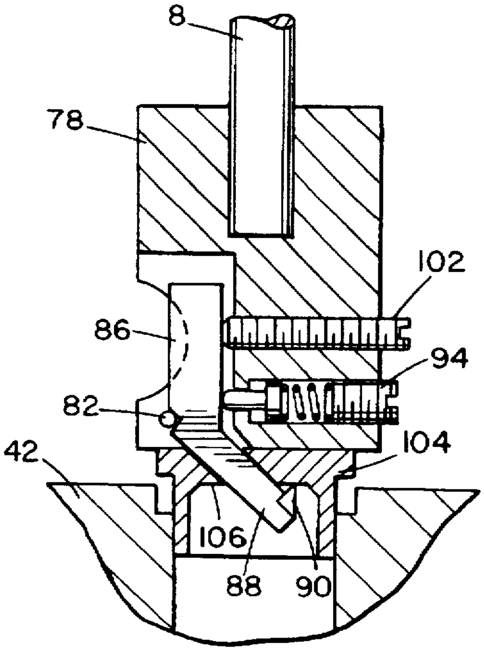
FIG. 12c

PULLING TOOL FOR EXTRACTING RING INSERTS

CROSS-REFERENCES TO RELATED APPLICATIONS

This is a divisional of application Ser. No. 08/217,694 filed Mar. 25, 1994 now abandoned, which is a Continuation-in-part of application Ser. No. 08/138,465, filed Oct. 15, 1993 now U.S. Pat. No. 5,406,685.

BACKGROUND OF THE INVENTION

A number of tools are commercially available for extracting rings, bushings or other inserts which are tightly fitted within a confined recessed area. A particular example of an insert which must, on occasion, be extracted is the valve seat within a cylinder head on an internal combustion engine. Typically, existing pullers have jaws, usually two or three jaws, which work with the force created by either a slide hammer or a screw. The jaws are clamped against the part to be removed with a screw/bolt system, then the force is applied to the puller to remove the part.

Several difficulties can be experienced by the users of such valve seat pullers. Among these problems is the loosening of the jaws as a result of the application of force, which may be applied as either a rapid strike of a hammer or as a slow compression by turning the screw. This results in repeated interruption of the process to re-tighten the pressure of the jaws on the part. Such interruptions can be particularly problematic when the location of the insert to be removed is difficult to reach and the angle of approach is awkward. The size of many pullers compounds the difficulties experienced in hard-to-reach places.

Another disadvantage of existing pullers is that they are easily thrown off-balance when the force is applied, resulting in the majority of the force being applied to one jaw only. This can either cause the jaw to break, or can pull the insert out at an angle. As with the frequent loosening of the jaws, they must be repositioned repeatedly during the operation before the insert is completely extracted.

Another type of insert which is commonly removed from a cylinder head is the pre-combustion chamber of a diesel engine. These chambers are particularly problematic for removal since the opening at the top of the chamber is relatively small (compared to valve seats) and is offcenter, making it extremely difficult to use the conventional jaw pullers.

Other disadvantages of conventional pullers are that they are usually heavy and bulky due to the length of the threaded shaft of the screw-type puller or due to the size of the slide hammer itself in the impact-type puller. Further, in order to avoid damaging the housing from which the insert is being removed, a spacer ring is often used to rest on the ring or other insert to be removed. This "blinds" the operator, preventing visual control of how the jaws clamp the insert.

Methods of extracting press fitted valve inserts (valve seats) in engine cylinder head include: 1) metal turning, where the valve insert is machined out of the cylinder head. This method is time consuming and expensive, but does not damage the housing in the cylinder head. 2) Welding a cord inside of the valve seats to loosen the seat out of its housing when the metal cools down and retracts. This process is also time consuming and may cause deterioration of the surrounding surfaces by distributing slag around the work site. To avoid this damage, the user must protect the surrounding surfaces, especially the valve guides in the cylinder head. 3)

Using conventional pullers as described above, which is inefficient and time consuming. 4) Inserting a lever inside of the ring or insert to lift it out of the housing. Commonly, the insert will come out at an angle, damaging the housing. If the housing is damaged, it will have to be machined to removed the damage, and the resulting larger diameter requires the use of repair inserts—an insert which is of a non-standard

BRIEF SUMMARY OF THE INVENTION

It is an advantage of the present invention to provide an impact puller that applies a uniform force for removal of a valve seat or pre-combustion chamber from an engine cylinder head to avoid requiring frequent repositioning and adjustment of the tool.

It is a further advantage of the present invention to provide a tool for extraction of valve seats, rings, or other inserts which introduces minimal risk of damage to the housing from which the insert is being removed.

Still another advantage of the present invention is to provide a tool which has minimal risk of breakage during use when compared with conventional pullers.

Yet another advantage of the present invention is to provide a puller which is compact and easy to use regardless of the location and angle required for access to the insert to be removed.

In a first exemplary embodiment, which may be used to extract annular inserts, such as valve seats, the pulling tool has a pulling head, comprising a cone connected to the shaft and a pivotally mounted toothed claw combination with at least two claws. Each claw is supported by an extension or "claw arm" that extends outward from the housing and has one or more pivot points within which the pivot axis of the claw may be disposed. Each claw is sloped on its inner edge to cooperate with the sloped edge of the upper part of the cone so that, as the cone moves upward, the claw pivots so that the toothed portion of the claw is forced outward. The cone and claws are selected to fit closely within the opening in the insert.

The present invention further includes means for applying a force the pulling head, which may comprise a handle attached to a housing and a lever pivotally attached to the housing. The lever controls a feed pad which applies an upward force to a shaft which slides freely through a bore in the housing in a direction generally perpendicular to the handle. When the lever is depressed, the shaft is lifted, pulling up on the cone which causes the claws to pivot and the teeth of the claws to penetrate the metal of the insert on its inner diameter to firmly lock into the insert. While the pressure is maintained on the lever, a pneumatic impact puller attached to the upper end of the shaft is activated by introducing compressed air into a piston and cylinder combination to provide rapidly repeated strikes of moderate force in an upward direction to pull the insert from the housing. After the insert has been extracted from the recess, a release lever loosens the feed pad from the shaft, allowing the force on the claws to be released so that the insert can be removed from the claws, readying the pulling tool to extract the next insert.

Alternatively, the force for initiating the pull is applied by placing a threaded bolt wheel on a threaded shaft. When the bolt wheel is rotated downward on the shaft it transfers an upward force on the shaft, causing the cone to move upward with respect to the claws, forcing the claws outward.

The cone and claws are changeable to allow use of the puller in different diameter openings. A fastener at the end of the shaft is used to allow the cone to be removed and replaced. If the shaft is threaded according to the above alternate embodiment, the cone can have a matching internal thread so that it screws onto the end of the shaft. The claws can be of different lengths, and can also be adjusted to be effective in larger diameter openings by shifting the pivot axis of the claw outward to a different pivot point on the claw support arm.

In a second exemplary embodiment, which may also be used to extract annular inserts, such as valve seats, the pulling head at the end of the shaft has an annular shape with integrally formed claws around its periphery. As in the first embodiment, the cone and claws are selected to fit closely within the opening in the insert and are changeable to allow use of the puller in different diameter openings. The pulling head is generally cylindrical with a lip at its bottom and slots running up the sides of the cylinder parallel to the shaft; i.e., a collet, in which the slots allow the lower portion of the head to expand radially. The sectioning of the sides of the cylinder effectively forms a plurality of resilient claws, with the lip at the bottom of each claw serving as the tooth. Each claw can be moved in a radial direction with respect to the remainder of the pulling head so that the force applied to the collet is the same as that described above with respect to the first embodiment. When the shaft is lifted, pulling up on the cone, the claws flex radially outwardly and the teeth penetrate the metal of the insert on its inner diameter. As in the first embodiment, a pneumatic impact puller may then be used to provide the bulk of the force for extracting the insert from the recess in which it is lodged.

In a third exemplary embodiment, which may be used to extract inserts having a central or eccentric opening, such as pre-combustion chambers, one end of the pulling head is rigidly connected to the shaft. A claw is pivotally mounted to the other end of the pulling head. The claw has a tooth on one end facing generally back toward the pulling head. The toothed end of the claw is inserted from the outside surface of the insert through the opening in the insert. The pulling head has a set screw with an end contacting a portion of the claw opposite the pivot point with respect to the toothed end of the claw. Rotating the set screw moves it axially, thereby pushing the claw and rotating the toothed end toward the rear surface of the insert and into contact with it. The tooth penetrates the metal of the insert to firmly lock into it. As in the first and second embodiments, a pneumatic impact puller may extract the insert from the recess in which it is lodged.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 12*a*, 12*b* and 12*c* illustrate the action of the illustrate the action of the pulling head shown in FIGS. 10 and 11 prior to application of forces, after application of forces, and after removal of the insert, respectively.

DETAILED DESCRIPTION OF THE PREFERRED EMBODIMENTS

The following detailed description uses relative positions, e.g., top and bottom, or upper and lower, for illustrative purposes only, to coincide with the orientation of the figures. This description should not be taken to indicate that the inventive puller is limited to operation in such an orientation.

Figure 1:
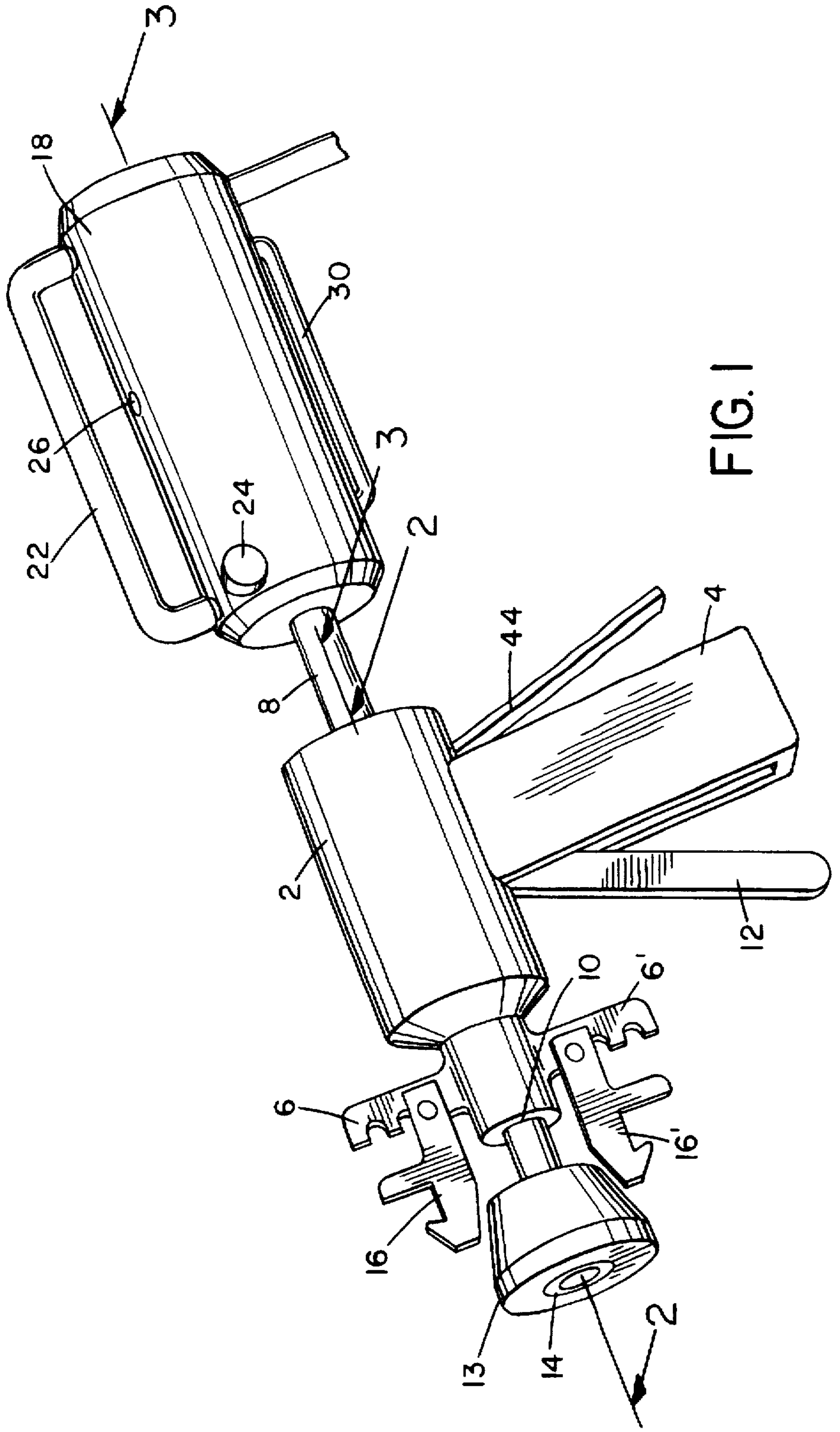
FIG. 1 is a perspective view of an embodiment of the pulling tool of the present invention with a lever-operated actuator for applying a gripping force.

As illustrated in FIG. 1, an embodiment of the pulling tool of the present invention comprises a housing 2 to which is attached a handle 4 and a pair of claw arms 6 and 6' which are disposed at 180 degrees with respect to each other. (Note that any number of claw arms may be used, in which case the arms will be disposed at even spacings. For example, if three arms are used, the claw arms will be spaced at 120 degrees.) Shaft 8 moves slidably through bore 10 in housing 2 in a direction generally perpendicular to the handle 4. Lever 12 pivots within housing 2 to create an upward force on shaft 8 by means that will be more clearly described below. At the lower end of shaft 8 a cone 13 is firmly but releasably held in place by a fastener 14. Claws 16 and 16' are pivotally disposed on claw arms 6 and 6', respectively.

At the upper end of shaft 8 is attached a pneumatic driver comprising a cylinder 18 and piston 20 (shown in FIG. 3) driven by compressed air introduced into cylinder 18 through air hose 22. Once activated by depressing activator button 24, the pneumatic driver produces a rapidly pulsed force on the shaft 8 in an upward direction. The pulsing is enabled by air apertures 26 and 26' which allow the compressed air to escape from the cylinder after the piston 20 has been lifted. The pressure differential in the cylinder opens relief valve 28 which redirects the compressed air through air hose 30, forcing the piston 20 back down to the bottom of the cylinder 18. The continuous application of compressed air into the cylinder 18 produces repeated shocks of moderate force which, when applied to the shaft 8 cause a uniform lifting motion for removal of a valve seat 40 or other insert within a corresponding housing 42, which, in the case of a valve seat is an engine cylinder head. (The valve seat 40 and housing 42 are shown in FIGS. 4*a*–4*c*.) Once the valve seat 40 has been extracted from its housing 42, release lever 44 is depressed to release the shaft 8, allowing the claws and the cone 13 to be separated so that the claws can be retracted from the valve seat and the valve seat removed.

Figure 2:
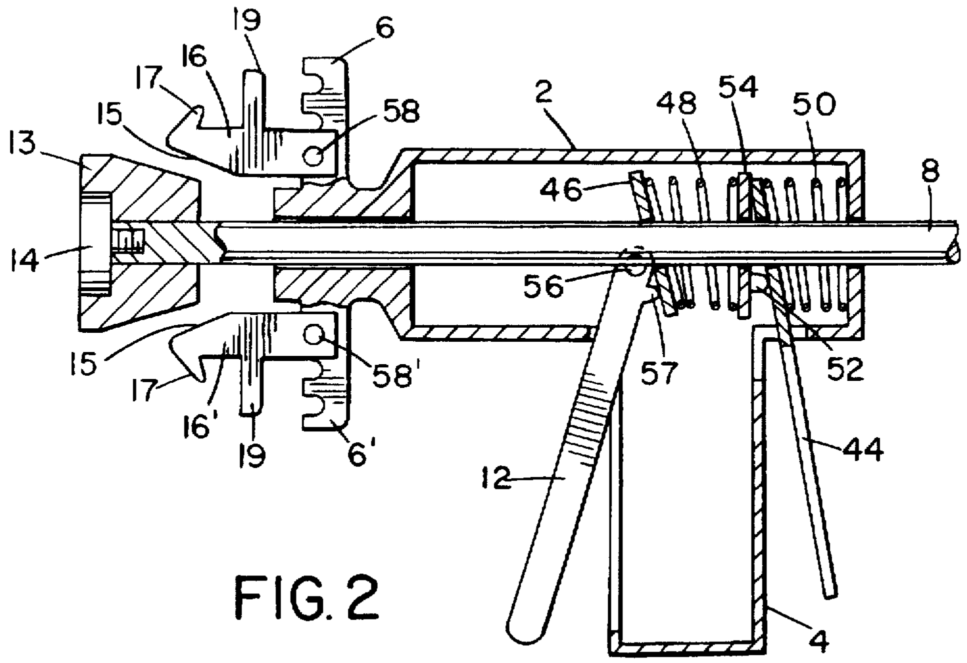
FIG. 2 is a cross-sectional view taken along line 2—2 of FIG. 1.
Figure 3:
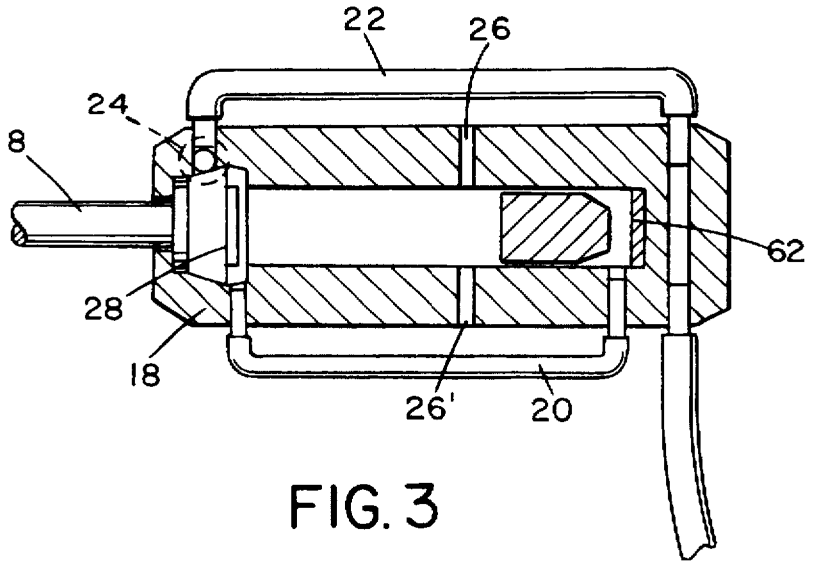
FIG. 3 is a cross-sectional view taken along line 3—3 of FIG. 1.
Figures 4A, 4B, 4C:
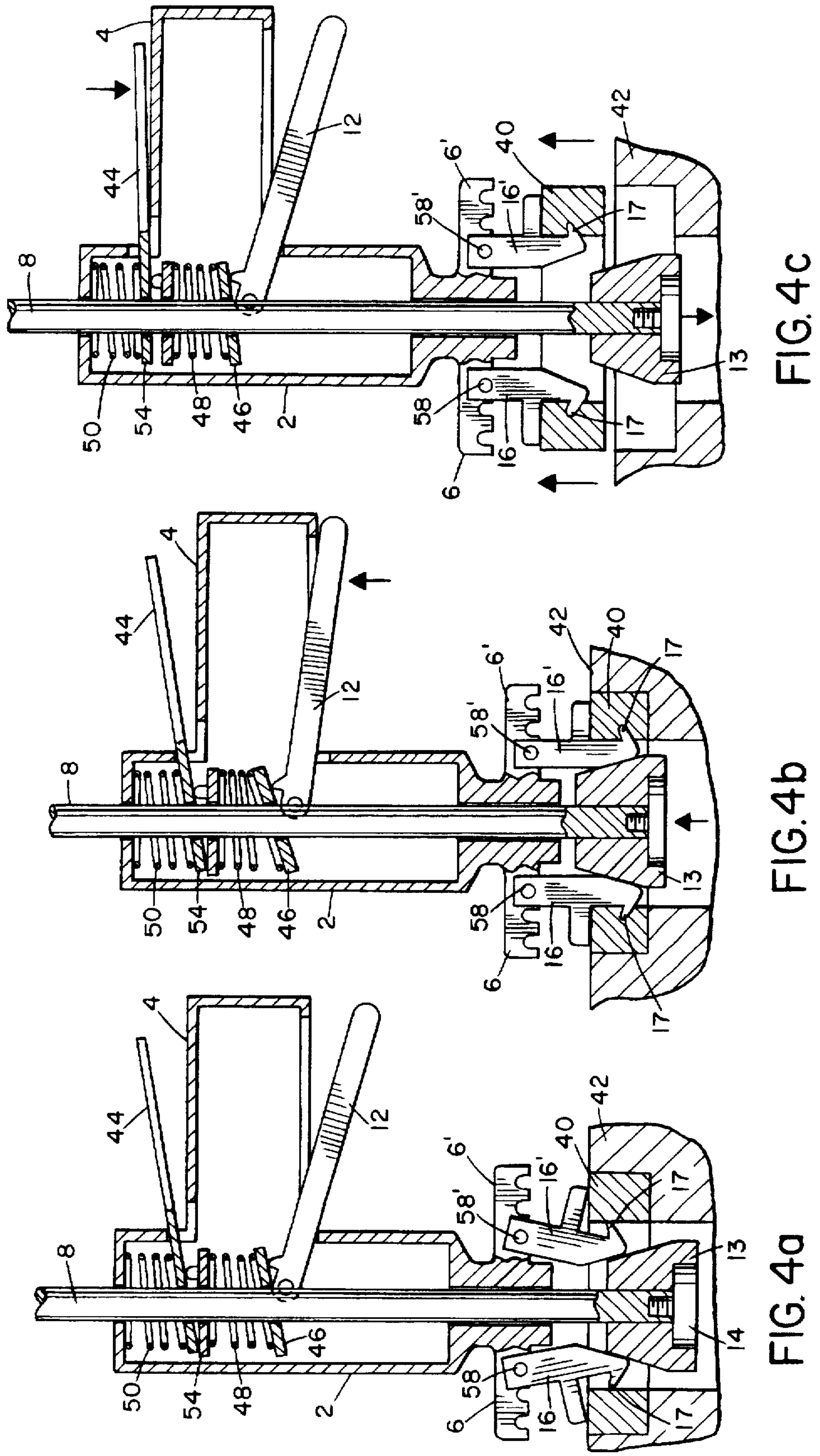
FIGS. 4*a*, 4*b* and 4*c* illustrate the action of the pulling head shown in FIGS. 1 and 2 prior to application of forces, after application of forces, and after removal of the insert, respectively.

The functional elements of the invention can be more clearly seen in FIGS. 2 and 3, which are the cross-sections of the housing 2 and cylinder 18, respectively.

As illustrated in FIG. 2, the functional elements within housing 2 are the feed pad 46, springs 48 and 50, fulcrum 52, plate 54 and lever pivot pin 56. Spring 48 maintains feed pad 46, essentially a washer-like ring, at an angle such that shaft 8 can slide freely through feed pad 46 until it is activated. To create the initial force to lift the cone 13, lever 12 is pulled upward toward handle 4 so that it pivots on pivot pin 56 which is attached to housing 2. Lug 58 on the inner end of lever 12 places an upward-force on the bottom of feed pad 46, compressing the inner side of spring 48 and causing the angle of feed pad 46 with respect to shaft 8 to increase, pitting the inner edges of feed pad 46 tightly against shaft 8 and producing an upward motion of the shaft. This upward motion of the shaft causes an upward motion of cone 13 with respect to the claws 16 and 16'. The claws each have a tooth 17 extending outward and an inside angle 15 opposite the tooth. A lip 19 extends from the claw above tooth 17 to catch the top surface of the insert to be removed. The outside angle of cone 13 cooperates with the inside angles 15 of claws 16 and 16' to increase the outward force on the teeth of the claws as the cone is lifted. The claws pivot on pivot pins 57 and 57' driving the teeth 17 outward so that they dig into the interior wall of valve seat 40. Pressure is maintained on lever 12 until the actual extraction means is activated, e.g., a pneumatic puller.

The construction of the claw arms 6 and 6' is such that multiple pivot points are provided. This allows the pulling tool to be adapted for different diameter openings by moving the pivot pins 57 and 57' to the appropriate pivot point. The claws must be moved symmetrically so that the force applied by the pulling tool is uniform within the valve seat 40.

In conjunction with the movement of the claw location on the claw arms, the cone may be changed to a larger or smaller diameter, whichever is appropriate, to adapt to different inner diameters. This change can be effected by removing fastener 14 from the end of shaft 8, and substituting the desired cone, then replacing the fastener.

Although it may be used with a sliding inertia hammer, the tool is preferably used in combination with a pneumatic driver which is shown in detail in FIG. 3.

The top of shaft 8 is attached to the bottom of cylinder 18 within which piston 20 moves upon the application and release of air pressure within the cylinder. Compressed air is introduced into cylinder 18 by depressing activator button 24 which opens a valve, permitting the compresses air to pass through air hose 22 into the bottom of cylinder 18. (Note that activator button 24 may be positioned remotely from the cylinder in the form of a foot pedal which is a valve in the air line, or may be a power switch for a solenoid-controlled valve in the air line.) The compressed air lifts piston 20 so that it strikes the top 62 of cylinder 18, transferring an upward force to the cylinder and shaft 8 connected thereto. Air apertures 26 and 26' permit the compressed air to exit the cylinder 18 once the piston has passed them in its upward travel. This change in pressure causes relief valve 28 to open, directing the compressed air through air hose 30 forcing the piston 20 back down to the bottom of the cylinder. Due to the small volume of cylinder 18 above piston 20, the return force on the piston is less than that involved in its upward travel. Once the piston reaches the bottom of cylinder 18 the process is repeated, producing a rapidly pulsed upward force on the shaft 8 with a frequency on the order of 2000 to 3000 strikes per minute. These repeated strikes allow an effective force to be applied to the shaft 8 to remove valve seat 40 without using a sudden, high power strike which can pull the jaws off of the insert or can result in an uneven transfer of force in conventional pullers.

Once the valve seat 40 (or other insert) has been extracted, the inlet valve controlled by activator button 24 is closed, removing the compressed air from the cylinder.

The basic steps for extraction of an insert using the lever feed mechanism are illustrated in FIGS. **4*a*–4*c*. Arrows are provided in each of these figures to indicate the direction of force. In FIG. 4*a*, the cone 13 is inserted into the open center 65 of the insert 40. The cone 13 has a maximum diameter that is slightly smaller than the inner diameter of the insert 40. Generally, the cone 13 is selected so that the distance it extends below the lowest point of the claw is approximately two times the size that the claws are to be expanded. The claws 16 and 16' are inserted into the open center 65 until the lip 19 contacts the upper surface of the housing 42. In FIG. 4*b*, the lever 12 is squeezed toward handle 4 forcing feed pad 46 to push upward on shaft 8. This lifts the cone 13 so that its sloped edge applies pressure to the inward slope 15 of claws 16 and 16'. As a result of this pressure, the claws pivot on pivot pins 57 and 57', driving the teeth 17 into the inner wall of insert 40. The force on lever 12** is maintained until the pneumatic puller or other means for applying an upward force is activated.

After the insert 40 has been extracted from the housing 42, release lever 44 is depressed to release the feed pad's hold on the shaft 8, as shown in FIG. **4*c*. Release lever 44 consists of a washer-like ring at the end of a lever with the interior diameter of the ring portion being slightly larger than the outer diameter of the shaft 8. When release lever 44 is depressed, fulcrum 52 causes the ring portion of the lever 44 move upward so that the inner edges of the ring portion pit themselves against shaft 8, causing shaft 8 to move upward. (Spring 50 holds the release lever 44 so that it is not in contact with shaft 8 until release is desired.) The upward movement of the shaft 8 relieves the pressure of the cone 13 on the claws 16 and 16'. The claws can then be manually pivoted inward to release their hold on the interior wall of the insert 40**.

Referring now to the pneumatic driving mechanism which preferably provides the bulk of the force for extracting the insert, the air pressure for driving the pneumatic puller can be regulated to increase the number of strikes. In the process of extracting valve seats from a cylinder head it is possible to determine the amount of pull needed to extract the first valve seat, then use the same inlet air pressure to removed subsequent valve seats. Also, the size of the cylinder and piston determines the amount of force provided. For greater force, larger diameter cylinders and pistons can be used. The impact puller of the present invention will work for extraction of virtually any type of ring insert. The puller does not damage the housing around the insert, and is capable of rapidly extracting the insert without requiring repeated positioning and adjustment of the tool. The pneumatic impact provides the efficiency needed using lesser forces, further minimizing the risk of damage to the housing.

Figure 5:
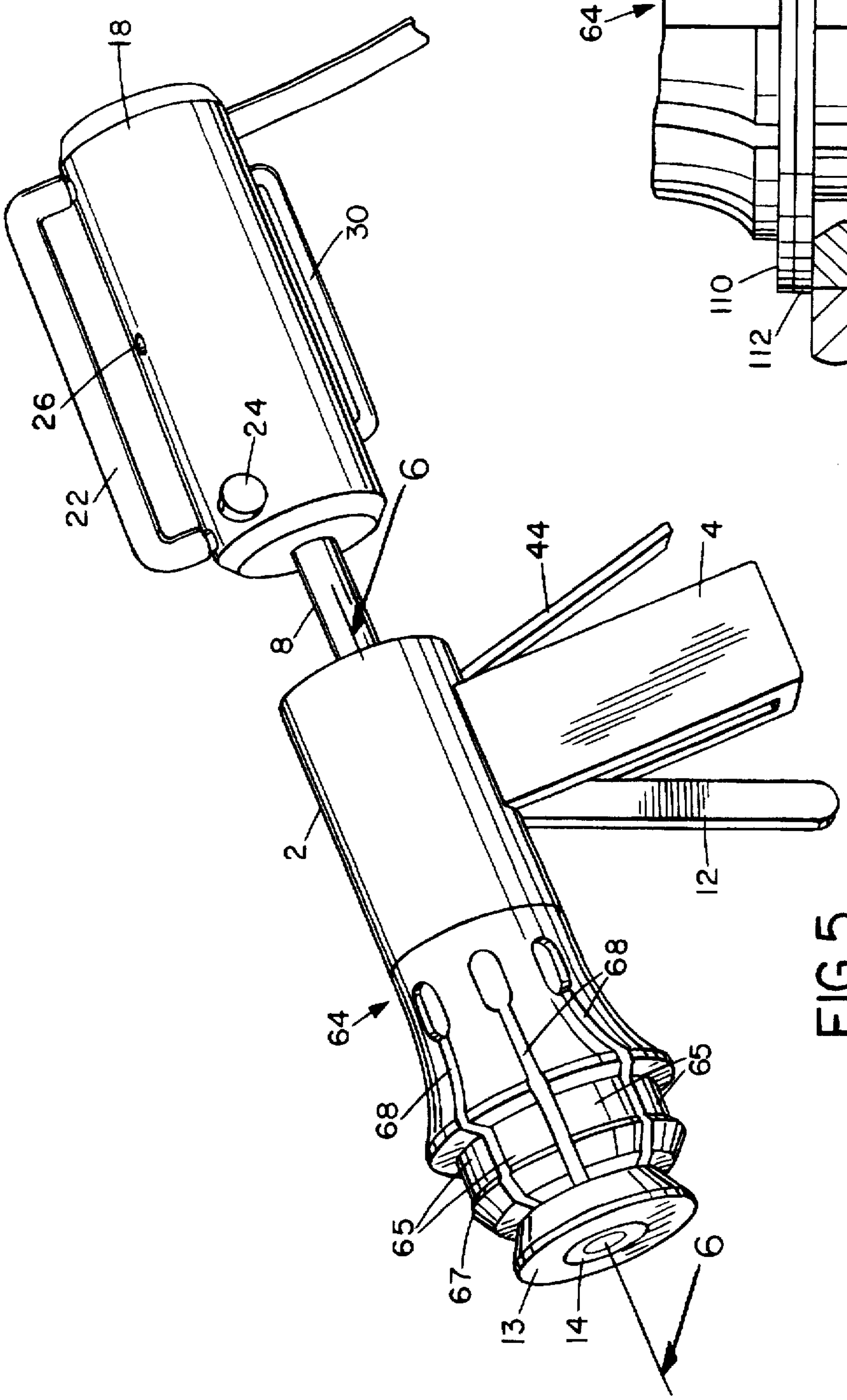
FIG. 5 is a perspective view of another embodiment of the pulling tool of the present invention with a lever-operated actuator for applying the gripping force.
Figure 6:
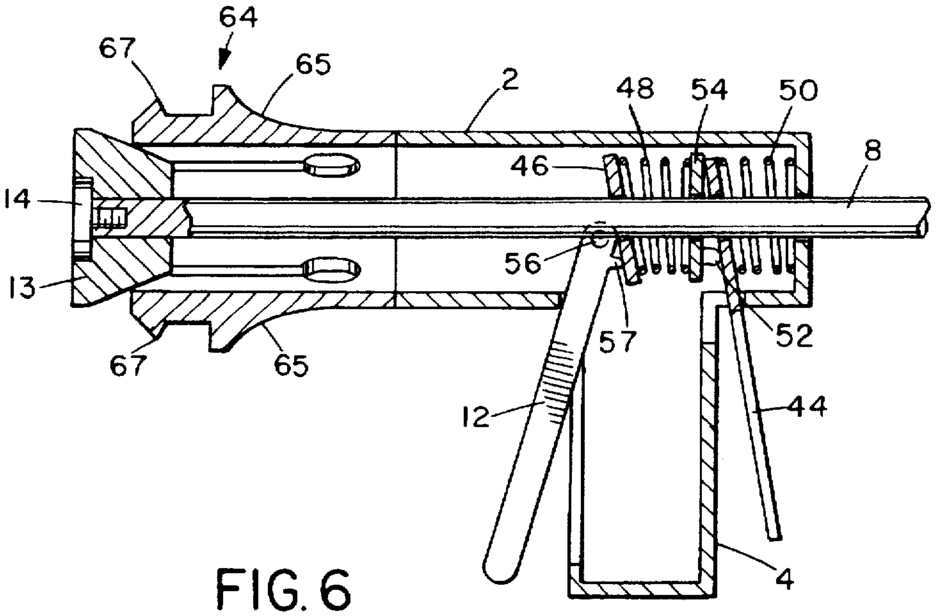
FIG. 6 is a cross-sectional view taken along line 6—6 of FIG. 5.

As illustrated in FIG. 5, another embodiment of the pulling tool of the present invention comprises an expandable collet 64 with six integrally formed claws 65 about its periphery. The size of the collet is such that, when relaxed, its diameter is smaller than the inner diameter of the valve seat, so that it fits in easily. The fully expanded diameter of the collet is equal to the inner diameter of the valve seat plus 1 mm for large valve seats or plus 0.5 mm for smaller valve seats. For example, a valve seat with an inner diameter of 40.5 mm requires a collet of 39 mm to expand up to 41.5 mm. Each claw 65 has a tooth 67. Claws 65 are evenly spaced with slits 68 between adjacent claws 65. Cone 13 is held in place at the lower end of shaft 8 by fastener 14. The size of cone 13 is selected so that, when it is within the collet 64, its lowest point protrudes a distance x which is twice the size that the collet is to be expanded. Once the cone is flush with the bottom of the collet, the diameter from claw to claw is increased by x /2. The size of the cone may be used to adjust the collet expansion. When lever 12 is actuated as described above, cone 13 moves upward into collet 64, thereby lifting cone 13 and applying a force to claws 65 in a radially outward direction. Claws 65 are sufficiently resilient to expand outwardly in response to this force. The surfaces of claws 65 inside collet 64 may be angled to increase leverage. Actuating release lever 44 releases cone 13, thereby allowing claws 65 to return to their relaxed position. The above-described pneumatic driver may be used to extract an insert.

Figure 13:
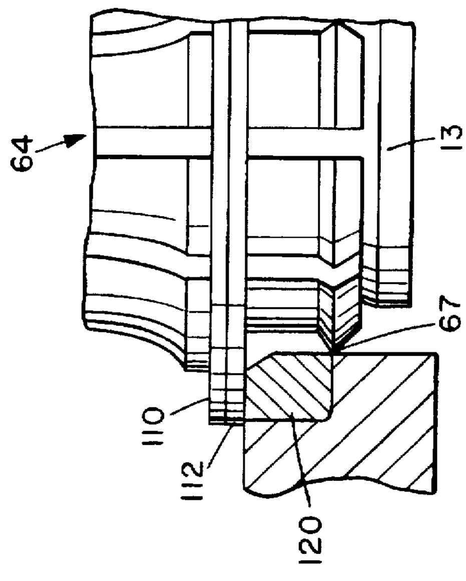
FIG. 13 is a side elevation of a collet with spacers with the cylinder head cut away.

One or more spacers may be placed over the outer surface of collet 64 to provide an open space above the tooth 67 equal to the height of the valve seat 120. As shown in FIG. 13, the spacers 110 and 112 allow adjustment for the variations in the depths of valve seats. The spacers may also be used with other embodiments of the pulling head.

Figure 7:
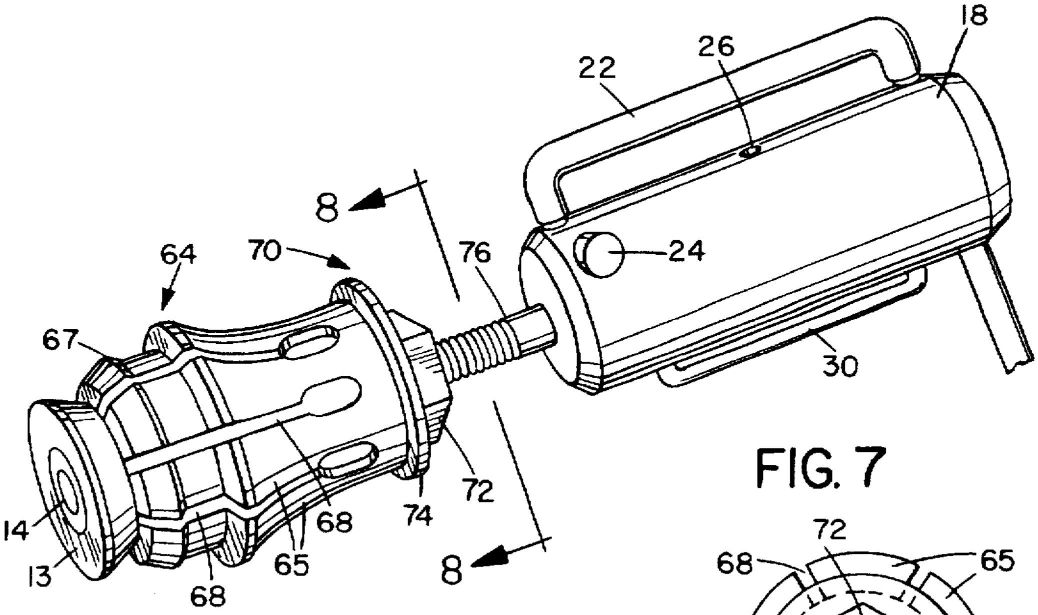
FIG. 7 is a perspective view of an embodiment of the present invention similar to that shown in FIGS. 1 and 5, but with a bolt-wheel actuator for applying the gripping force.
Figure 8:
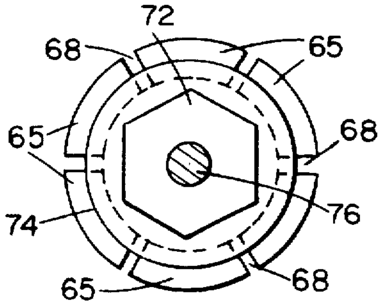
FIG. 8 is a plan view taken along line 8—8 of FIG. 7.

In a similar embodiment, illustrated in FIGS. 7 and 8, the gripping force may be applied using a bolt wheel 70 as an alternative to the lever mechanism. In the exemplary embodiment, bolt wheel 70 comprises a flat annular portion 74 and a polygonal nut 72 having internal threads. A threaded shaft 76 engages nut 72 and is connected to the pneumatic driver. In this embodiment, the gripping force is generated by rotating bolt wheel 70 relative to threaded shaft 76. The relative rotation moves cone 13 upward into collet 64, expanding it as described above. The nut 72 may be replaced by any internally-threaded body having a thread which cooperates with the threaded shaft, and which also provides means for gripping its exterior so that the bolt wheel can be rotated on the shaft.

Figure 9A:
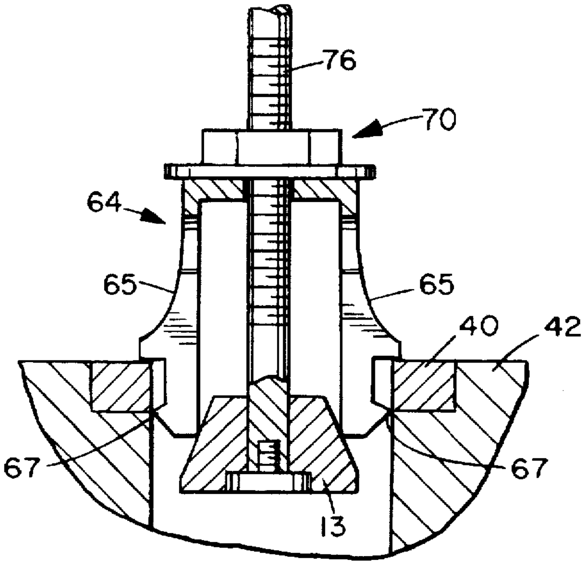
FIG. 9*a*, 9*b* and 9*c* illustrate the action of the pulling head shown in FIGS. 5 and 6 prior to application of forces, after application of forces, and after removal of the insert, respectively.
Figure 9B:
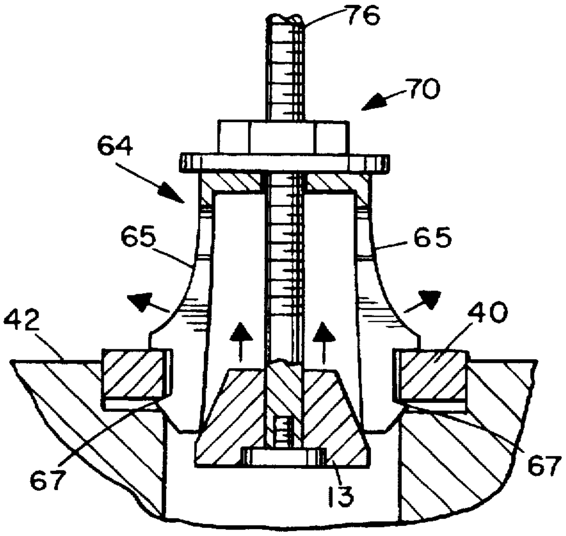
Figure 9C:
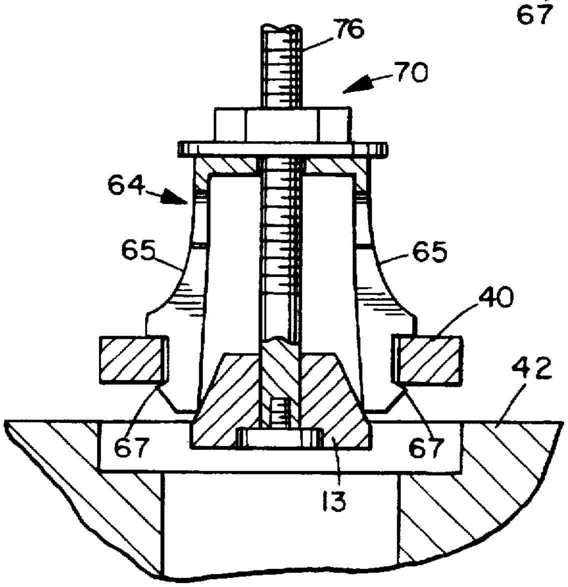

The steps for extracting an insert using the embodiment of the present invention shown in FIGS. 5–8 is illustrated in FIGS. **9*a*–9*c*. Claws 65 are inserted through the opening in valve seat 40, as shown in FIG. 9*a*. Bolt wheel 70 is rotated with respect to shaft 76. This motion lifts cone 13 into collet 64 and expands claws 65 outwardly. Tooth 67 of each claw 65 is driven into the inner wall of valve seat 40, as shown in FIG. 9*b*. The pneumatic puller or other means for applying a pulling force may then be used to extract valve seat 40 from housing 42 once the initial "bite" has been made with the bolt wheel. The extracted valve seat may be released from collet 64 by rotating bolt wheel 70 in the opposite direction to allow the claws 65** to resile to their unexpanded position.

Figure 10:
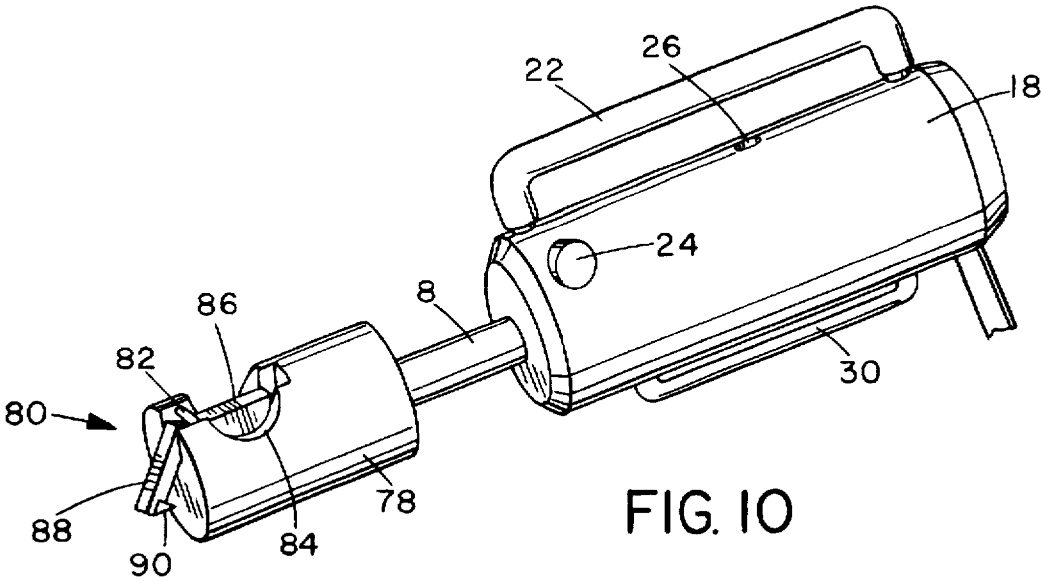
FIG. 10 is a perspective view of another embodiment of the pulling tool of the present invention.
Figure 11:
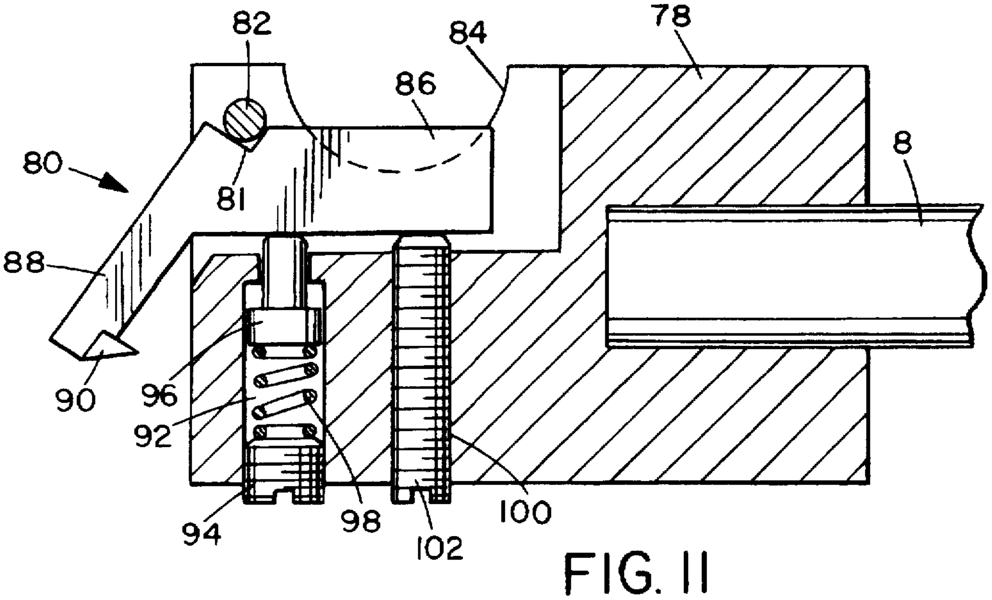
FIG. 11 is an enlarged cross-sectional view taken along line 11—11 of FIG. 10.

Another embodiment of the present invention, illustrated in FIGS. 10 and 11, may be used to extract inserts having a central or eccentric opening. A body 78 is connected to shaft 8. A claw arm 80 has a notch 81 that engages a pivot pin 82 in body 78. One edge of body 78 has a semicircular opening 84 that exposes the proximal portion 86 of claw arm 80. A distal portion 88 of claw arm 80 is oriented at an angle with respect to proximal portion 86. The angle is preferably 125 degrees. However, different claw arms 80 having different angles may be used to accommodate various types of inserts. Distal portion 88 has a tooth 90. A first bore 92 in body 78 has a first set screw 94 threadably engaged in a threaded end and a piston 96 slideably disposed in an unthreaded end. A spring 98 bears against first set screw 94 and biases piston 96 toward proximal portion 86 of claw arm 80. This force, in turn, maintains notch 81 of claw arm 80 in pivoting engagement with pivot pin 82. Claw arm 80 may easily be removed and replaced with a different claw arm by depressing proximal portion 86 and unhooking it from pivot pin 82. The pulling tool may thus be adapted for different sizes of inserts that are to be extracted. A second threaded bore 100 engages a threaded second set screw 102. Rotating set screw 102 applies a force to proximal end 86 of claw arm 80, thereby rotating it about pivot pin 82.

The steps for extracting an insert, such as a pre-combustion chamber 104 of a diesel internal combustion engine, using the embodiment of the present invention shown in FIGS. 5–8 is illustrated in FIGS. **12*a*–12*c*. Distal end 88 is hooked through the opening in precombustion chamber 104 and body 78 is disposed adjacent chamber 104, as shown in FIG. 12*a*. Set screw 102 is rotated to move it toward proximal end 86. In response to the force experienced by proximal end 86, distal end 88 rotates tooth 90 toward the inside surface 106 of pre-combustion chamber 104. Tooth 90 is driven into inside surface 106 of pre-combustion chamber 104, which bears against body 78, as shown in FIG. 12*b*. The pneumatic puller or other means for applying a pulling force may then be used to extract pre-combustion chamber 104 from housing 42. The extracted pre-combustion chamber 104 may be released by rotating set screw 102** in the opposite direction.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

I claim:

1. A pulling tool for extracting an insert from a recessed area, said insert having an outside surface, an inside surface, a first diameter, and an opening between said outside and inside surfaces, said opening having a second diameter smaller than said first diameter, comprising:

a pulling head having an axis;

a shaft having a first end and a second end, said first end being attached to said pulling head so that said shaft is coaxial with said axis of said pulling head;

a single claw pivotally mounted on said pulling head for pivoting on an axis perpendicular to and off-axis with respect to said shaft, said claw having first and second elongated claw portions with a pivot pin therebetween;

said first elongated claw portion having a tooth for engaging said inside surface of said insert when said first elongated claw portion extends through said opening at an oblique angle with respect to said shaft, said pulling head contacting said outside surface when said first elongated claw portion extends through said opening at said oblique angle;

means for applying a gripping force to said second elongated claw portion for pivoting said first elongated claw portion toward said inside surface of said insert; and means for applying a pulling force to said shaft for urging said pulling head in a direction away from said recessed area.

2. A pulling tool as in claim 1 wherein said means for applying a pulling force comprises:

a cylinder having an inner diameter, a first end and a second end;

a piston disposed within said cylinder;

means for introducing compressed air into said second end to drive said piston toward said first end so that it strikes an interior of said first end; and means for releasing said compressed air from said cylinder after said piston has struck said interior of said first end so that said piston returns to said second end;

wherein said second end of said shaft is attached to said second end of said cylinder and the force created by said piston striking said interior of said first end is transferred to said shaft.

3. A pulling tool as in claim 1 wherein said first and second elongated claw portions are oriented at a nonzero angle with respect to one another.

4. A pulling tool as in claim 3 wherein said non-zero angle is approximately 125 degrees.

5. A pulling tool as in claim 3 wherein said means for applying gripping force to said second elongated claw portion comprises a set screw.

6. A pulling tool as in claim 5 wherein said second elongated claw portion is parallel to said shaft when said first elongated claw portion extends through said opening.

7. A pulling tool as in claim 6 wherein said means for applying a pulling force comprises:

a cylinder having an inner diameter, a first end and a second end;

a piston disposed within said cylinder;

means for introducing compressed air into said second end to drive said piston toward said first end so that it strikes an interior of said first end; and means for releasing said compressed air from said cylinder after said piston has struck said interior of said first end so that said piston returns to said second end;

wherein said second end of said shaft is attached to said second end of said cylinder and the force created by said piston striking said interior of said first end is transferred to said shaft.

8. A pulling tool as in claim 1, wherein:

said claw has a notch for removably engaging said pivot pin; and said pulling tool further comprises a spring-biased pin in contact with said second claw portion for biasing said notch into engagement with said pivot pin.

9. A pulling tool for extracting an insert from a recessed area in a housing, said insert having an outer sidewall, an inner dimension, and a top portion having an exterior surface and an interior surface, said top portion having an opening therethrough having a diameter less than said inner dimension, said pulling tool comprising:

a pulling head comprising:

a body having an upper portion and a lower portion, said lower portion having a claw attachment area disposed therein;

a pivot pin disposed within said claw attachment area;

a removable claw having a distal end and a proximal end, said removable claw being pivotably disposed on said pivot pin so that said distal end extends beyond said lower portion of said body, said distal end having a tooth extending therefrom;

means for applying a gripping force to said proximal end of said removable claw for pivoting said distal end of said removable claw and said tooth;

a shaft having a first end and a second end, the first end being attached to said upper portion of said body;

pulling force means in contact with said shaft for applying a pulling force to said shaft for urging said pulling head in a direction away from said recessed area;

wherein said pulling head is disposed in contact said exterior surface of said top portion with said distal portion of said removable claw extending through said opening at an angle, said means for applying a gripping force causes said tooth to engage said interior surface of said top portion, and the pulling force causes said distal end of said removable claw to pull against the interior surface of said top portion to pull said insert away from said recessed area.

10. A pulling tool as in claim 9 wherein the pulling force means comprises:

a cylinder having an inner diameter, a first end and a second end;

a piston disposed within said cylinder;

means for introducing compressed air into said second end to drive said piston toward said first end so that it strikes an interior of said first end; and means for releasing said compressed air from said cylinder after said piston has struck said interior of said first end so that said piston returns to said second end;

wherein said second end of said shaft is attached to said second end of said cylinder and the force created by said piston striking said interior of said first end is transferred to said shaft.

11. A pulling tool as in claim 9 wherein said distal end and said proximal end of said removable claw are disposed at a non-zero angle with respect to each other.

12. A pulling tool as in claim 11 wherein said nonzero angle is approximately 125 degrees.

13. A pulling tool as in claim 9 wherein said means for applying a gripping force to said proximal end comprises a set screw rotatably disposed within said body so that a portion of said set screw is partially extendable into said claw attachment area.

14. A pulling tool as in claim 11 wherein said proximal end is substantially parallel to said shaft when said distal end is inserted through said opening.

15. A pulling tool as in claim 9, wherein said removable claw further includes a notch between said distal end and said proximal end for engaging said pivot pin.

16. A pulling tool as in claim 15, further comprising a spring-biased pin disposed within said body so that a portion of said spring-biased pin extends into said claw attachment area, said spring biased pin being adapted for applying a biasing pressure against said proximal portion of said removable claw for biasing said notch into engagement with said pivot pin.

17. A pulling tool for extracting a pre-combustion chamber from a diesel engine, the pre-combustion chamber having a generally cylindrical shape, a top portion and an opening through said top portion, said opening having an opening dimension smaller than an inner diameter of said generally cylindrical shape and being disposed eccentrically with respect to an axial center of said pre-combustion chamber, the pulling tool comprising:

a body having an upper portion and a lower portion, said lower portion having a recessed area therein;

a pivot pin disposed within said recessed area;

a pivoting claw having a distal portion, a pivot point, and a proximal portion disposed at an angle relative to said distal portion, said pivoting claw being pivotably mounted on said pivot pin at said pivot point so that said proximal portion is retained within said recessed area and said distal portion extends beyond said lower portion of said body;

an engaging tooth extending from said distal portion in a generally upward-facing direction;

pivoting force means disposed within said body and in contact with said proximal portion of said pivoting claw for applying a pivoting force to said proximal portion for pivoting said pivoting claw at said pivot point;

a shaft having a first end and a second end, the first end being attached to said upper portion of said body;

pulling force means in contact with said shaft for applying a pulling force to said shaft for urging said body in a direction away from said diesel engine;

wherein when said body is disposed in contact with an exterior surface of said top portion of said pre-combustion chamber and said distal portion of said pivoting claw is inserted through said opening substantially at said angle, said pivoting force means applies a pivoting force causing said distal portion of said pivoting claw to pivot toward an interior surface of said top portion so that said tooth engages said interior surface, and the pulling force causes said distal portion of said removable claw to pull against the interior surface of said top portion to pull said pre-combustion chamber away from said diesel engine.

18. A pulling tool as in claim 17 wherein said pivoting force means comprises a set screw rotatably disposed within said body so that a portion of said set screw is partially extendable into said recessed area.

19. A pulling tool as in claim 17 wherein said proximal portion of said pivoting claw is substantially parallel to said shaft when said distal portion is inserted through said opening.

20. A pulling tool as in claim 17, further comprising a spring-biased pin disposed within said body so that a portion of said spring-biased pin extends into said recessed area, said spring biased pin being adapted for applying a biasing pressure against said proximal portion of said pivoting claw for biasing said pivot point into engagement with said pivot pin.

* * * * *